United States Patent
Sato et al.

(10) Patent No.: US 6,296,799 B1
(45) Date of Patent: Oct. 2, 2001

(54) PLATE-LIKE COMPOSITE MATERIAL AND METHOD OF PRODUCING THE SAME

(75) Inventors: Kan'ichi Sato; Masayuki Oishi, both of Hirakata; Satoshi Fujimoto; Makoto Nogawa, both of Hiratsuka, all of (JP)

(73) Assignee: Komatsu LTD, Tokyo (JP)

( * ) Notice: Subject to any disclaimer, the term of this patent is extended or adjusted under 35 U.S.C. 154(b) by 0 days.

(21) Appl. No.: 09/171,093

(22) PCT Filed: Apr. 7, 1997

(86) PCT No.: PCT/JP97/01190

§ 371 Date: Oct. 13, 1998

§ 102(e) Date: Oct. 13, 1998

(87) PCT Pub. No.: WO97/39869

PCT Pub. Date: Oct. 30, 1997

(30) Foreign Application Priority Data

Apr. 22, 1996 (JP) .................................................. 8-100569

(51) Int. Cl.[7] .............................. B29C 43/18; B29C 43/20
(52) U.S. Cl. ............................ 264/259; 156/106; 264/1.7; 264/261; 264/265; 264/294
(58) Field of Search ............................ 156/106; 264/259, 264/261, 265, 294, 1.7

(56) References Cited

U.S. PATENT DOCUMENTS

| | | |
|---|---|---|
| 3,666,614 | 5/1972 | Snedeker et al. . |
| 5,322,660 | 6/1994 | Hickman .............................. 264/261 |
| 5,418,025 | * 5/1995 | Harmand et al. ....................... 428/38 |
| 5,593,786 | 1/1997 | Parker et al. ......................... 428/426 |
| 5,667,897 | 9/1997 | Hashemi et al. ....................... 428/426 |
| 5,895,721 | * 4/1999 | Naoumenko et al. ............... 428/429 |

FOREIGN PATENT DOCUMENTS

| | | |
|---|---|---|
| 53-28475 | 8/1978 | (JP) . |
| 58-985 | 1/1983 | (JP) . |
| 63-262241 | 10/1988 | (JP) . |
| 1-80418 | 5/1989 | (JP) . |
| 4-364910 | 12/1992 | (JP) . |
| 5-514 | 1/1993 | (JP) . |
| 5-84867 | 4/1993 | (JP) . |
| 5-96235 | 4/1993 | (JP) . |
| 5-208467 | 8/1993 | (JP) . |
| 6-23910 | 2/1994 | (JP) . |
| 7-205374 | 8/1995 | (JP) . |
| WO96/12604 | 5/1996 | (WO) . |

* cited by examiner

Primary Examiner—D. S. Nakarani
(74) Attorney, Agent, or Firm—Armstrong, Westerman, Hattori, McLeland & Naughton, LLP (57) ABSTRACT

A composite sheet material, in which at least either one of opposed surfaces is composed of a glass layer for the purpose of surface protection from scratching, can be easily produced without causing bonding defects and stress-strain. A method of such a material is also disclosed. This material comprises (a) a glass layer made of sheet glass and constituting one of the opposed surfaces of the composite sheet material; and (b) a resin layer constituting the other surface of the material and molded by applying a uniform pressure to an entire molten resinous material introduced onto the glass layer so as to be elongated, spreading over the glass layer, these glass layer and said resin layer being laminated.

14 Claims, 5 Drawing Sheets

PLATE-LIKE COMPOSITE MATERIAL AND METHOD OF PRODUCING THE SAME

TECHNICAL FIELD

The present invention relates to a composite sheet material, in particular, suitable for the manufacture of windshields mounted in automobile vehicles and a method of making the same. The composite sheet material comprises a glass layer constituting one of the opposed surfaces of the material and a resin layer constituting the other surface, these layers being provided in a laminated fashion.

BACKGROUND ART

Composite sheet materials often include a glass layer at at least either surface to achieve light weight and surface protection from scratching. One known type of such composite sheet materials is a laminate having a glass layer formed by bonding sheet glass to the front surface of a pre-molded resin sheet. Another type is a laminate having glass layers which are formed by bonding sheet glass to the front and rear surfaces of a pre-molded resin sheet respectively such that the resin sheet is sandwiched between the glass layers.

These types of composite sheet materials, however, reveal the drawback that since sheet glass is bonded to a pre-molded resin sheet, gaps are created between the resin sheet and the sheet glass if the surface of the resin sheet is not flat because of warp and shrinkage and these gaps result in bonding defects.

The invention is directed to overcoming this problem and one of the objects of the invention is therefore to provide a composite sheet material and its producing method, the material having at least a glass layer constituting either one of its opposed surfaces for the purpose of surface protection from scratching. This composite sheet material can be easily produced without causing bonding defects and is free from stress-strain.

DISCLOSURE OF THE INVENTION

The above object can be accomplished by a composite sheet material according to one aspect of the invention, the material comprising:
(a) a glass layer made of sheet glass and constituting either one of the opposed surfaces of the composite sheet material; and
(b) a resin layer constituting the other surface of the material and molded by applying a uniform pressure to an entire molten resinous material introduced onto the glass layer so as to be elongated, spreading over the glass layer,
the glass layer and the resin layer being laminated together.

According to another aspect of the invention, there is provided a composite sheet material comprising:
(a) a first glass layer made of sheet glass and constituting either one of the opposed surfaces of the composite sheet material;
(b) a second glass layer constituting the other surface of the material and made of sheet glass disposed parallel with the first glass layer; and
(c) a resin layer formed between the first and second glass layers and molded by applying a uniform pressure to an entire molten resinous material introduced between the first and second glass layers so as to be elongated, spreading over the first and second glass layers.
the first glass layer, the resin layer and the second glass layer being laminated in order.

According to still another aspect of the invention, there is provided a composite sheet material comprising:
(a) a glass layer made of sheet glass and constituting either one of the opposed surfaces of the composite sheet material;
(b) a first resin layer constituting the other surface of the material and made of a resin sheet disposed parallel with the glass layer; and
(c) a second resin layer formed between the glass layer and the first resin layer and molded by applying a uniform pressure to an entire molten resinous material introduced between the glass layer and the first resin layer so as to be elongated, spreading over the glass layer and the first resin layer,
the glass layer, the second resin layer and the first resin layer being laminated in order.

The composite sheet material of the invention has a resin layer which is molded by applying a uniform pressure to an entire molten resinous material which has been introduced onto a glass layer made of sheet glass, such that the molten resinous material is elongated, spreading over the glass layer. Therefore, the composite sheet material has at least one glass layer which constitutes either surface of the material and is hardly damaged by scratching, while being free from bonding defects likely to occur between the glass layer and the resin layer. Additionally, since a uniform pressure is applied to an entire molten resinous material, thereby elongating the molten material to form the resin layer, no stress-strain is generated.

The pressure uniformly applied to the entire molten resinous material may be high enough to restrain the gas contained in the molten resinous material from growing to be bubbles. This prevents creation of bubbles which make the resin layer turbid.

According to a preferred embodiment of the invention, a silane coupling agent or Volan (trade name of E.I.du Pont de Nemous and Company, for methacrylatochromic chloride) is applied in pretreatment to the joint surface of the sheet glass of the glass layer which is to be joined to the resin layer. Alternatively, there may be provided an intermediate layer between the joint surfaces of the glass layer and the resin layer, the intermediate layer being made from, for example, a thermoplastic resinous material which is adhesive to the sheet glass and to the molten resinous material to be molded and which moderates the contraction difference and thermal expansion difference between the sheet glass and the molten resinous material during molding of the molten resinous material into the resin layer.

With the above arrangement, the bonding strength between the glass layer and the resin layer can be enhanced. Prior to the formation of the resin layer, the intermediate layer may be formed by primer coating in which the above resinous material is applied to the joint surface of the sheet glass to be joined to the resin layer or alternatively formed by affixing a resin film formed from the above resinous material to the joint surface.

The sheet glass is transparent while the molten resinous material is selected from the group consisting of polycarbonate, acrylic resin, polystyrene, amorphous polyolefin, polyethylene terephthalate, ethylene-vinyl acetate copolymers (EVA), thermoplastic polyurethane (TPU), ethylene-acrylate-maleic anhydride ternary copolymers, hydrogenated styrene butadiene rubber (SBR hydride), polyvinyl butyral (PVB) and polyolefin elastomers, and the uniform pressure applied to the entire molten resinous material is not less than 15 kg/cm² which is high enough to restrain the gas contained in the molten resinous material from growing to be bubbles. With this arrangement, the resultant composite sheet material is not turbid but transparent and free from stress-strain.

In cases where the composite sheet material is provided with the intermediate layer, the thermoplastic resinous material from which the intermediate layer is formed can keep its transparency after the formation of the resin layer and may be selected from the group consisting of polycarbonate, acrylic resin, polystyrene, amorphous polyolefin, polyethylene terephthalate, ethylene-vinyl acetate copolymers (EVA), thermoplastic polyurethane (TPU), ethylene-acrylate-maleic anhydride ternary copolymers, hydrogenated styrene butadiene rubber (SBR hydride), polyvinyl butyral (PVB) and polyolefin elastomers. In cases where the resin layer made of a resin sheet is provided, this transparent resin sheet is preferably formed from a resinous material which is harder and has a higher melting point than the molten resinous material used in molding and selected from the group consisting of polycarbonate, acrylic resin, polystyrene, amorphous polyolefin, polyethylene terephthalate, ethylene-vinyl acetate copolymers (EVA), thermoplastic polyurethane (TPU), ethylene-acrylate-maleic anhydride ternary copolymers, hydrogenated styrene butadiene rubber (SBR hydride), polyvinyl butyral (PVB) and polyolefin elastomers.

It should be noted that the thinner the sheet glass is, the more lightweight the resultant composite sheet material is.

The above object can be accomplished by a method according to the invention for producing a composite sheet material having a glass layer and a resin layer which are laminated together, the method comprising the steps of:

placing sheet glass in at least either of a pair of dies in a compression molding machine so as to come into close contact with the die;

applying a uniform pressure to an entire molten resinous material which has been introduced into a mold cavity, such that the molten resinous material is elongated, spreading over the sheet glass; and closing the dies to complete compression molding.

Preferably, the joint surface of the sheet glass to be joined to the resin layer molded from the molten resinous material is preliminarily coated, in primer coating, with a resinous material which is adhesive to the sheet glass and to the molten resinous material and which moderates the contraction difference and thermal expansion difference between the sheet glass and the molten resinous material during molding of the molten resinous material into the resin layer. Alternatively, a resin film formed from the above resinous material may be preliminarily affixed to the joint surface of the sheet glass.

The resultant, composite sheet material can be made to be free from turbidty and stress-strain by using the transparent sheet glass and the molten resinous material selected from the group consisting of polycarbonate, acrylic resin, polystyrene, amorphous polyolefin, polyethylene terephthalate, ethylene-vinyl acetate copolymers (EVA), thermoplastic polyurethane (TPU), ethylene-acrylate-maleic anhydride ternary copolymers, hydrogenated styrene butadiene rubber (SBR hydride), polyvinyl butyral (PVB) and polyolefin elastomers. Further, for avoiding turbidity and stress-strain, the uniform pressure applied to the entire molten resinous material should be no less than 15 kg/cm² which is high enough to restrain the gas contained in the molten resinous material from growing to be bubbles. It should be noted that the resinous material used in the primer coating and the resinous material of the resin film to be affixed are selected from thermoplastic resinous materials, which can keep their transparency after molding, such as polycarbonate, acrylic resin, polystyrene, amorphous polyolefin, polyethylene terephthalate, ethylene-vinyl acetate copolymers (EVA), thermoplastic polyurethane (TPU), ethylene-acrylate-maleic anhydride ternary copolymers, hydrogenated styrene butadiene rubber (SBR hydride), polyvinyl butyral (PVB) and polyolefin elastomers.

For making the resin layer thinner in some composite sheet material designs, the composite sheet material, which has been molded by elongating through the application of uniform pressure onto the entire molten resinous material, may be subjected to compression molding again wherein the composite sheet material is interposed between a first plate having a heater and a second plate parallel to the first plate and having a heater and then, the molten resinous material of the composite sheet material is again fluidized and elongated by applying a uniform pressure to the entire material. In this re-compression molding, the desirable molding temperature necessary for re-fluidizing and elongating the molten resinous material which has been once solidified is 200 C. or less and the desirable pressure necessary for re-fluidizing and elongating is 20 kg/cm² or less.

Other objects of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BEST MODE FOR CARRYING OUT THE INVENTION

Reference is now made to the accompanying drawings to describe a composite sheet material and its producing method according to a preferred embodiment of the invention in which an injection compression molding machine is used.

Figure 1:
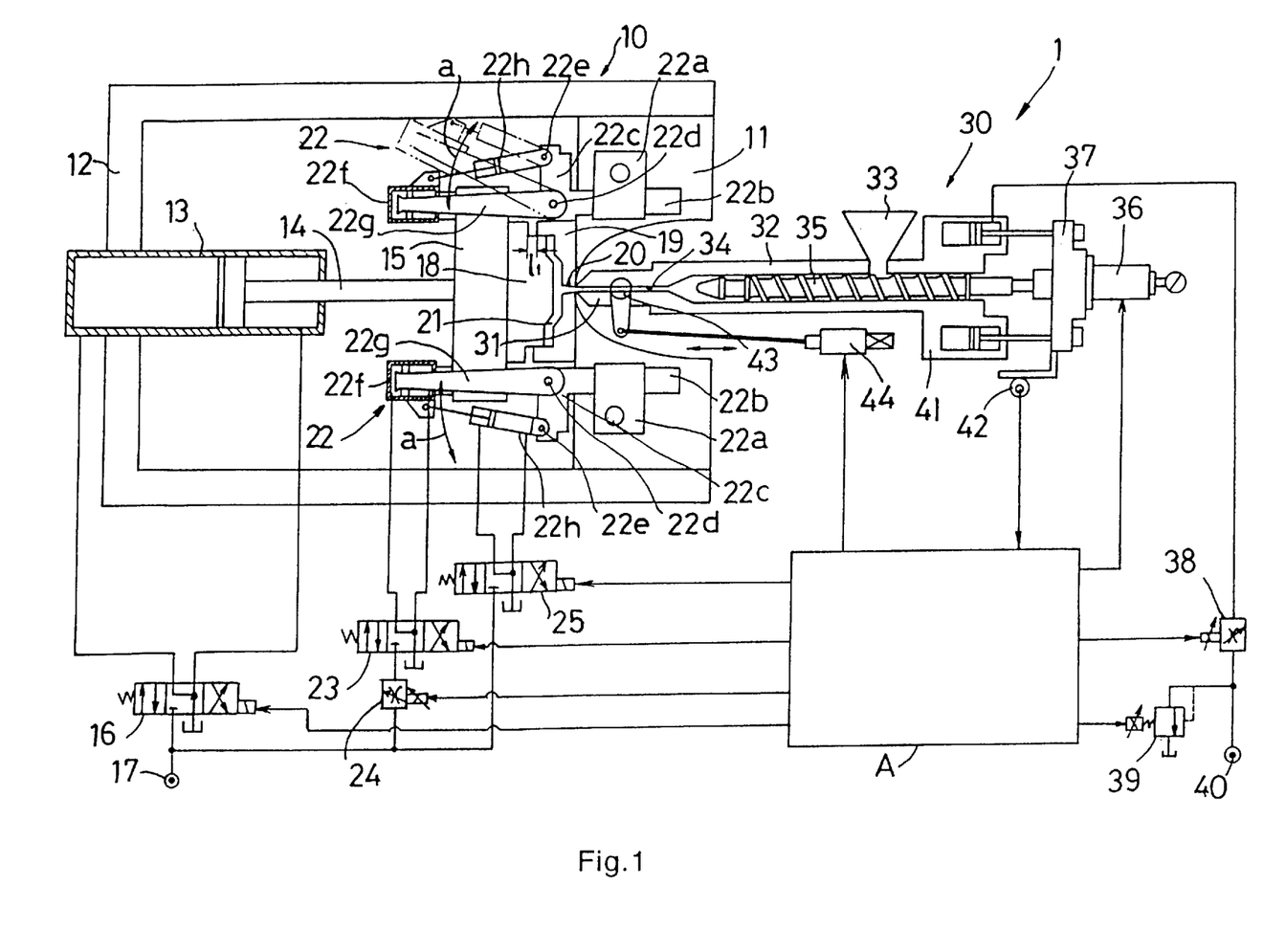
FIG. 1 illustrates, in schematic form, the entire structure of an injection compression molding machine used in the description of a composite sheet material and its method according to the invention.

Referring to FIG. 1 showing the entire schematic view of an injection compression molding machine, the injection compression molding machine 1 is made up of a compression molding unit 10, an injection unit 30 and a controller A for controlling the compression molding unit 10 and the injection unit 30. The compression molding unit 10 includes a die opening/closing cylinder 13 located on the left side of a frame 12 that is fixed to a table 11 so as to extend to the left. A movable die plate 15 disposed within the frame 12 is engaged with a piston rod 14 provided for the die opening/closing cylinder 13. This movable die plate 15 is operated to move to the left or right by controlling pressure oil that is supplied from a pressure oil source 17 to the die opening/closing cylinder 13 or discharged reversely, the pressure oil control being performed through the energization and deenergization control of a solenoid selector valve 16 by the controller A. Attached to the right side of the movable die plate 15 is a movable die 18. In opposed relation with this movable die 18, a fixed die 19 is attached to the left side of the table 11. The fixed die 19 is provided with an inlet 20 piercing therethrough, through which a molten resinous material is fed into a mold cavity 21 formed between the dies 18 and 19.

The compression molding unit 10 includes a die clamping apparatus 22 which locks the movable die plate 15 when the movable die 18 attached to the movable die plate 15 is placed in a position separated from the fixed die 19 by a predetermined spacing value $l_1$ after the movable die plate 15 has been driven to the right by the die opening/closing cylinder 13 and which allows the locked movable die plate 15 to further move to the right thereby clamping both of the dies 18 and 19. The die clamping apparatus 22 is composed of a pair of following mechanisms which are respectively disposed above and below the movable die plate 15.

Each mechanism in the die clamping apparatus 22 comprises (1) a height adjuster 22a secured to the table 11, (2) a cylinder frame 22c which is adjustable so as to move to the left or right, according to the thickness of the dies 18, 19 and to the predetermined spacing value $l_1$, by means of the height adjuster 22a through a rod 22b, and (3) a link 22g and a lock cylinder 22h which are supported to the cylinder frame 22c with pins 22d, 22e respectively so as to freely pivot in the direction of arrow a, the link 22g having a die clamping cylinder 22f at the leading end thereof while the lock cylinder 22h allows the link 22g to pivot in the direction of arrow a so as to be away from or come close to the movable die plate 15. It should be noted that the die clamping cylinder 22f and the lock cylinder 22h are operated by controlling pressure oil, which is supplied from the pressure oil source 17 to the cylinders 22f, 22h or discharged reversely, through the energization and deenergization control of solenoid selector valves 23, 25 and the flow rate control of a flow control valve 24 performed by the controller A, so that the movable die plate 15 moves rightward together with the movable die 18 and the link 22g moves in the direction of arrow a.

Next, the injection unit 30 will be described. The injection unit 30 has a nozzle section 31 joined to the inlet 20 of the fixed die 19 in the compression molding unit 10 and a screw 35 housed in a cylinder 32. In the heated cylinder 32, a resinous material (such as a plastic synthetic resin) fed from a material hopper 33 in the form of pellet or powder is weighed, while being melted and mixed, and then injected into the mold cavity 21 via a passage 34 piercing through the nozzle section 31 and via the inlet 20 of the fixed die 19 by means of the screw 35. The rotation of the screw 35 for melting and mixing of the resinous material is carried out by a screw rotating motor 36. The screw 35 and the screw rotating motor 36 are mounted to a base plate 37. The base plate 37 is operated to move to the left or right by controlling pressure oil which is supplied from a pressure oil source 40 to a hydraulic piston 41 or discharged reversely, the pressure oil control being carried out through the flow rate control of a flow control valve 38 and the pressure value setting control of a solenoid relief valve 39 performed by the controller A. In other words, not only the forward and backward movement of the screw 35 relative to the nozzle section 31 for weighing of the molten resinous material to be injected and for injection of the weighed molten resinous material into the mold cavity 21, but also the application of a predetermined pressing force to the screw 35 for the purpose of applying a predetermined injection pressure to the molten resinous material within the cylinder 32 is carried out through the base plate 37 by supplying pressure oil to the hydraulic piston 41 or discharging it therefrom.

The controller A is provided with a screw positional value that is obtained by measurement with a screw position detector 42 engaged with the base plate 37. Based on the comparison between this measured screw positional value and a preset stroke value, the controller A performs control in conjunction with the forward and backward movement of the screw 35 according to a specified program so that the solenoid selector valves 16, 23, 25, the flow control valves 24, 38, and the solenoid relief valve 39 are operated and so that the rotation and stop of the screw rotating motor 36 and the switching of an opening/closing valve 43 incorporated in the passage 34 of the nozzle section 31 are controlled through a servo motor 44.

With reference to FIGS. 2(a) to 2(e) and FIG. 3, there will be explained the steps of a method for producing the composite sheet material by use of the injection compression molding machine 1 of the above-described structure according to the invention. It should be noted that Stages I to VII in FIG. 3 correspond to the steps (I) to (VII) in the following description respectively.

(I) Setting step

Figure 2:
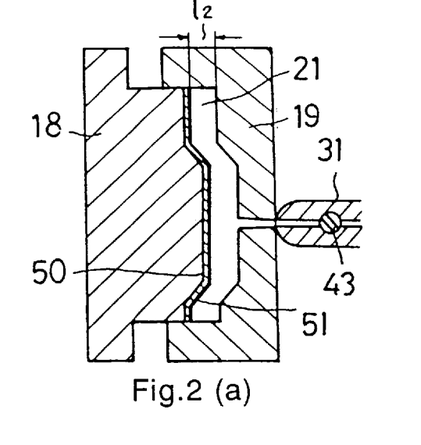
FIGS. 2(a) to 2(e) illustrate, in schematic form, each step of a process for producing the composite sheet material of the invention by use of the injection compression molding machine shown in FIG. 1.
Figure 3:
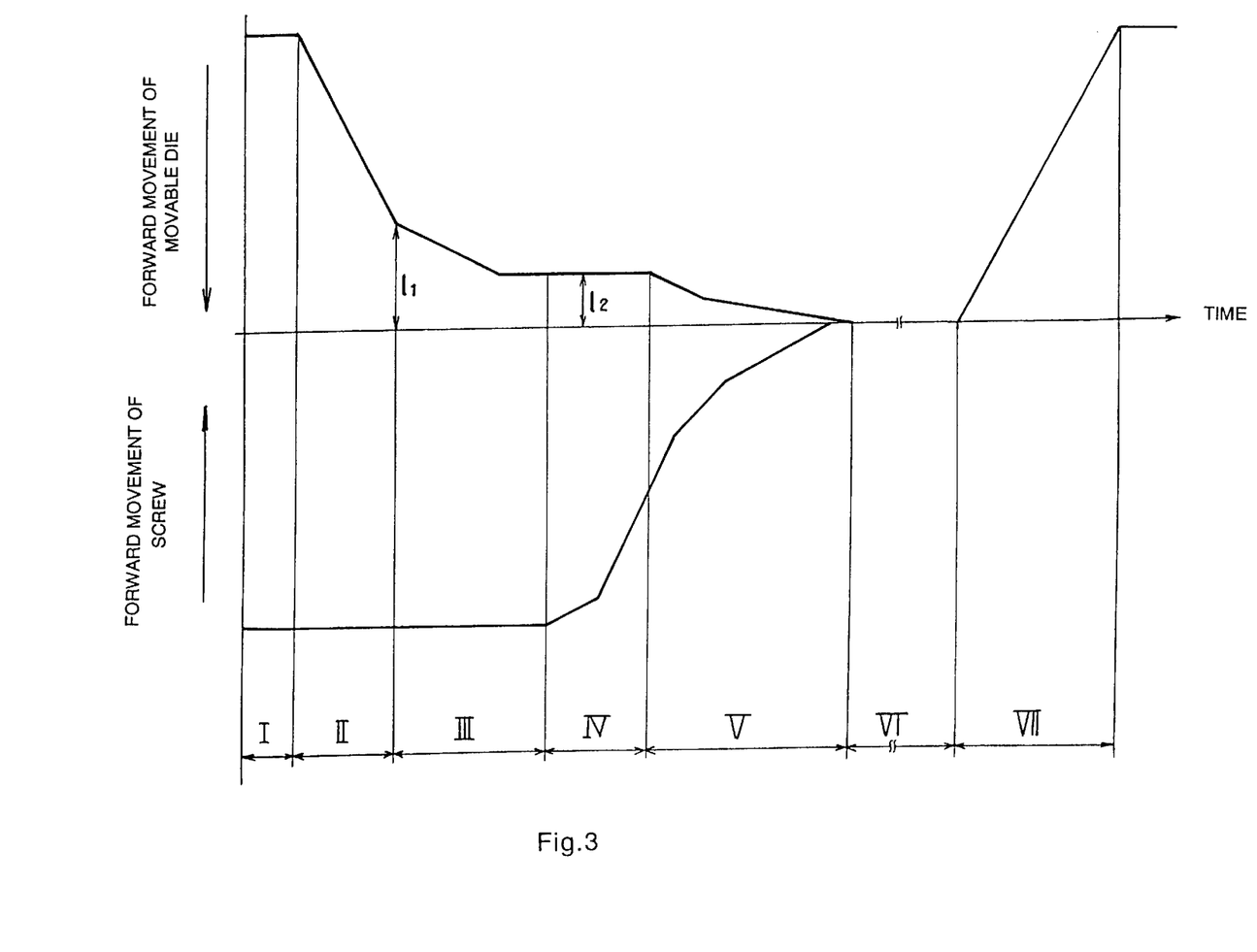
FIG. 3 is a sequence chart showing the movement of a movable die and the movement of a screw during the production of the composite sheet material of the invention by use of the injection molding machine shown in FIG. 1.

In this embodiment, when the movable die 18 is in a position separated from the fixed die 19 by more than the predetermined spacing value $l_1$, sheet glass 50 having a thickness of 0.1 mm and a specified shape is set so as to be in close contact with the inner side of the movable die 18. A resin film 51 made from a resinous material (described later) is affixed beforehand to the surface of the sheet glass 50, which surface is opposite to the surface contacting the movable die 18.

(II) Die closing step

Until the spacing between the movable die 18 holding the sheet glass 50 on its inner side and the fixed die 19 becomes equal to the predetermined spacing value $l_1$, the energization and deenergization control of the solenoid selector valve 16 is performed so that the movable die plate 15 is moved to the right by the die opening/closing cylinder 13 thereby, moving the movable die 18 forward.

(III) Movable die locking step (FIG. 2(a))

When the movable die 18 has reached a position located the predetermined spacing value $l_1$ away from the fixed die 19, the energization and deenergization control of the solenoid selector valve 25 is performed to allow the lock cylinder 22h to pivot the link 22g toward the movable die plate 15. Then, the energization and deenergization control of the solenoid selector valve 23 and the flow rate control of the flow control valve 24 are performed to drive the die clamping cylinder 22f such that the right end of the die clamping cylinder 22f comes in contact with the left surface of the movable die plate 15, whereby the movable die plate 15 and therefore the movable die 18 are locked. Sequentially, the movable die plate 15 is moved to the right by the die clamping cylinder 22f, thereby moving the movable die 18 forward until the movable die 18 reaches a position that is away from the fixed die 19 by a value equal to a compression width $1_2$.

(IV) Injection feeding step (FIG. 2(b))

When the movable die 18 has reached a position away from the fixed die 19 by a value equal to the compression width 12, the servo motor 44 is driven to open the opening/closing valve 43 in the nozzle section 31 of the injection unit 30. In the mean time, the flow rate control of the flow control valve 38 and the pressure value setting control of the solenoid relief valve 39 are performed, thereby moving the screw 35 forward with the help of the hydraulic piston 41 to inject a molten resinous material 52 into the mold cavity 21 via the passage 34 and the inlet 20. The pressure for injection feeding in this embodiment is 150 kg/cm$^2$ that is more than the pressure (=15 kg/cm$^2$) required for restraining the gas contained in the molten resinous material 52 from growing to be bubbles.

(V) Mold cavity compression step (FIG. 2(c))

While the molten resinous material 52 being injected into the mold cavity 21 at a pressure of 150 kg/cm$^2$, the movable die 18 is moved forward to the fixed die 19 by a distance equal to the compression width $1_2$ by means of the die clamping cylinder 22f so that the volume of the mold cavity 21 is reduced. In this forward movement, the dies 18, 19 are kept in a parallel relationship. A pressure of 100 kg/cm$^2$, which is more than the pressure required for restraining the gas contained in the molten resinous material 52 from growing to be bubbles, is uniformly applied to the entire resinous material 52 being injected so that the molten resinous material is elongated, spreading over the sheet glass 50 to form a layer of 3 mm in thickness. When the resinous material 52 in its molten state has been fed to the mold cavity 21 in an amount necessary for molding, the servo motor 44 is driven to close the opening/closing valve 43. At that time, the closing of the opening/closing valve 43 prevents the resinous material 52 from reversely flowing into the injection unit 30 due to the pressure of the press. The same effect can be achieved even if the opening/closing valve 43 is disposed within the resinous material passage of the die.

(IV) Cooling step (FIG. 2(d))

While the volume of the mold cavity 21 being reduced by moving the movable die 18 forward to the fixed die 19 by a distance equal to the compression width $1_2$(=$1_1$-a thickness of 3 mm (in this embodiment)), the elongated, molten resinous material 52 is continuously held and compressed under a holding pressure of 15 kg/cm$^2$ or more generated by the die clamping cylinder 22f until the molten resinous material 52 is cooled and bonded to the sheet glass 50 by virtue of the fusion of the resin film 51.

(VII) Die opening step (FIG. 2(e))

Figure 4:
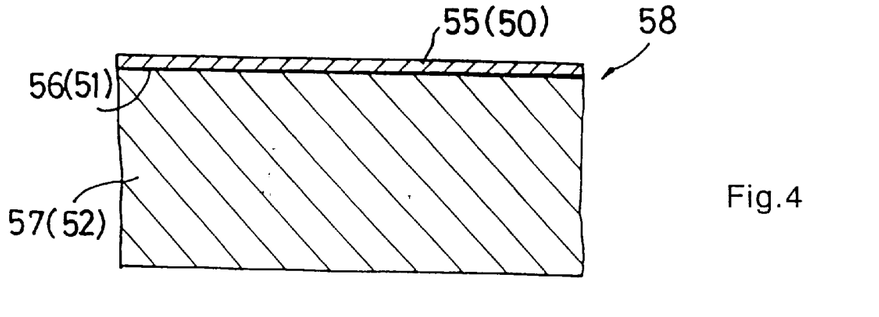
FIG. 4 is a sectional view of the composite sheet material produced through the steps shown in FIG. 2.

After cooling the molten resinous material 52, the energization and deenergization control of the solenoid selector valve 23 is performed thereby operating the die clamping cylinder 22f to release the movable die 18 and therefore the movable die plate 15 from the locked condition. Further, the energization and deenergization control of the solenoid selector valve 25 is performed thereby operating the lock cylinder 22h to allow the link 22g to pivot, departing from the movable die plate 15. Sequentially, the energization and deenergization control of the solenoid selector valve 16 is performed thereby operating the die opening/closing cylinder 13 to move the movable die plate 15 to the left for the backward movement of the movable die 18. In this way, a composite sheet material 58, in which a glass layer 55 formed from the sheet glass 50, an intermediate layer 56 formed from the resin film 51 and a resin layer 57 molded from the molten resinous material 52 are laminated in order as shown in FIG. 4, is removed out of the dies 18, 19.

Although the sheet glass 50 has a thickness of 0.1 mm in this embodiment, the preferable thickness of the sheet glass 50 may be within the range of from 0.1 to 3 mm. Although the resin layer 57 has a thickness of 3 mm in this embodiment, the preferable thickness of the resin layer 57 ranges from 3 mm to 6 mm. Of course, the thickness of the sheet glass 50 and the thickness of the resin layer 57 do not necessarily fall in the above ranges but may be out of the ranges depending on applications.

The suitable resinous material of the resin film 51 is adhesive to the sheet glass 50 and to the molding, molten resinous material 52 and can moderate the contraction difference and thermal expansion difference between the sheet glass 50 and the molding, molten resinous material 52 during molding of the molten resinous material 52 into the resin layer 57. By use of such a suitable resinous material for the resin film 51, the bonding strength between the glass layer 55 and the resin layer 57 can be enhanced. For providing transparency to the resultant composite sheet material 58, not only the sheet glass 50 but also the resinous material of the resin film 51 should be transparent. The suitable resinous material of the resin film 51 is selected from the same thermoplastic resinous materials that can be used as the molten resinous material 52 having transparency, which are polycarbonate, acrylic resin, polystyrene, amorphous polyolefin, polyethylene terephthalate, ethylene-vinyl acetate copolymers (EVA), thermoplastic polyurethane (TPU), ethylene-acrylate-maleic anhydride ternary copolymers, hydrogenated styrene butadiene rubber (SBR hydride), polyvinyl butyral (PVB) and polyolefin elastomers. For producing the composite sheet material 58 which is free from turbidity and stress-strain, the pressure applied to the molten resinous material 52 to elongate it over the sheet glass 50 during molding should be no less than 15 kg/cm$^2$ which is high enough to restrain the gas contained in the molten resinous material 52 from growing to be bubbles and this pressure should be uniformly applied to the entire molten resinous material 52.

Figure 5:
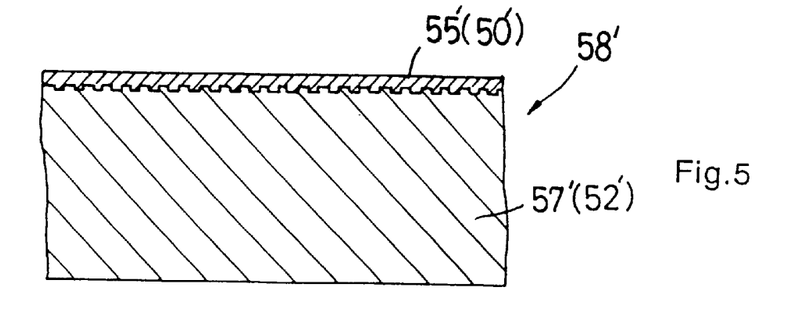
FIG. 5 is a sectional view of a composite sheet material produced according to an embodiment of the invention, which does not include an intermediate layer but has undergone pretreatment wherein a silane coupling agent or Volan is applied to the joint surface of sheet glass.

While the intermediate layer 56 is formed by affixing the resin film 51 made from one of the materials listed above in this embodiment, the intermediate layer 56 may be formed by primer coating in which such a resinous material is applied to the joint surface of the sheet glass 50. The composite sheet material does not necessarily include the intermediate layer 56. According to another embodiment, a composite sheet material 58' as shown in FIG. 5 does not include the intermediate layer but a silane coupling agent or Volan is applied in pretreatment to the joint surface of sheet glass 50' that constitutes a glass layer 55' in order to enhance bonding strength.

It should be noted that in cases where the composite sheet material includes the above intermediate layer 56, it is possible to apply printing treatment to the joint surface of the sheet glass 50 to which the above resin film 51 is affixed or primer coating has been applied. Also, mirror finishing may be applied to the joint surface of the sheet glass 50 joining to the intermediate layer 56, or a transparent conductive film such as an indium-tin oxide film may be formed on the joint surface by sputtering.

Figure 6:
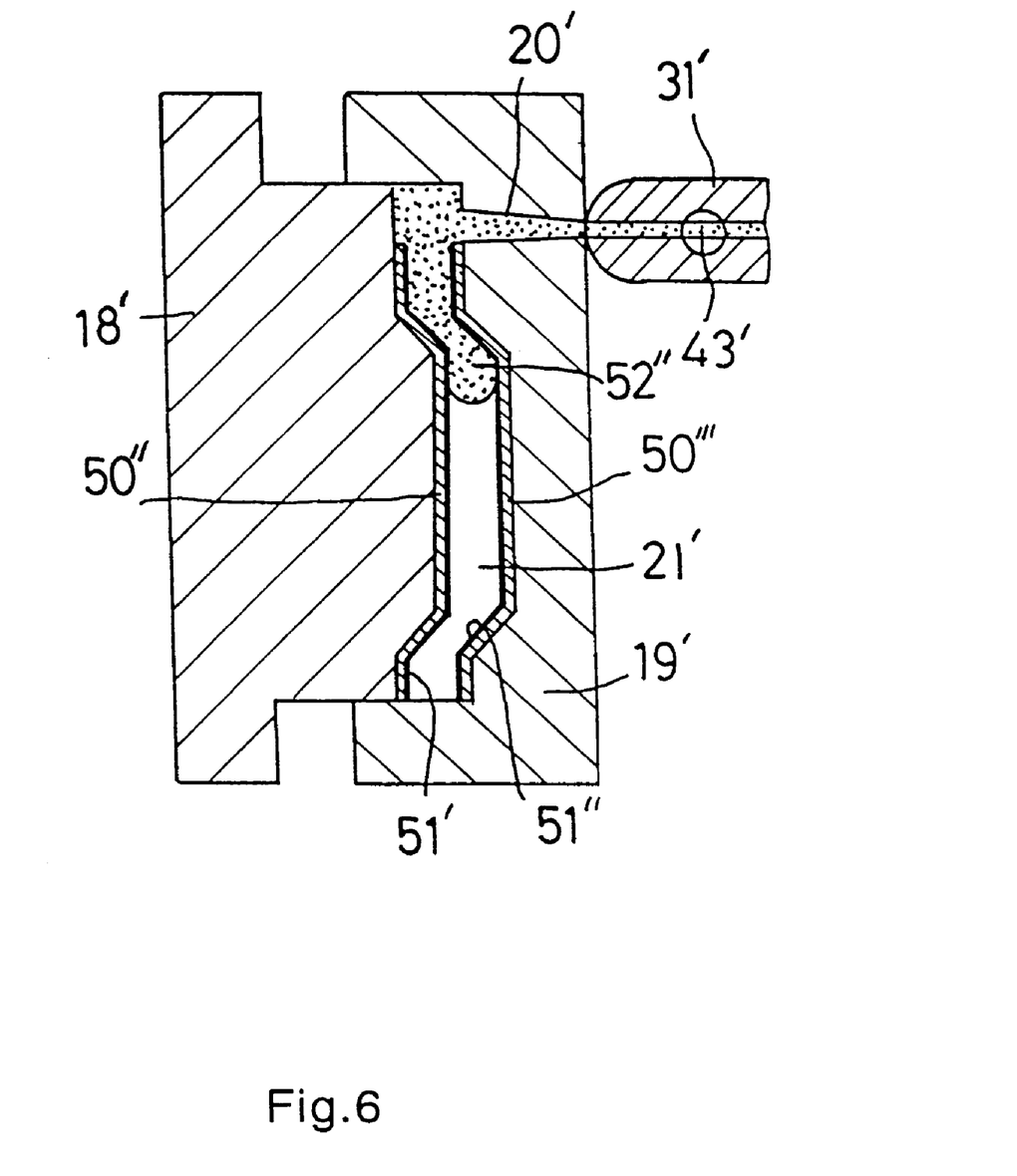
FIG. 6 is a schematic view corresponding to FIG. 2(b), which illustrates a process for producing a composite sheet material having glass layers on both surfaces according to another embodiment of the invention.
Figure 7:
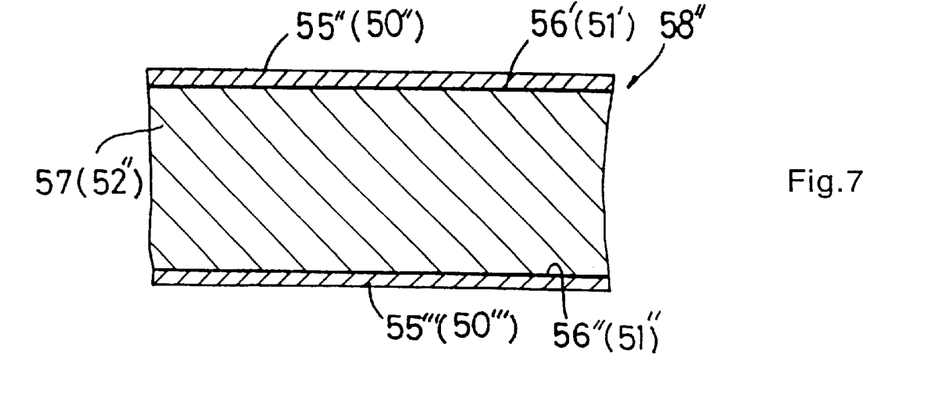
FIG. 7 is a sectional view of the composite sheet material produced through the process shown in FIG. 6.

While the composite sheet material 58 in this embodiment includes the glass layer 55 constituting one surface thereof, a composite sheet material 58" according to another embodiment has glass layers 55", 55"' on both surfaces as shown in FIG. 7. This composite sheet material 58" can be produced by the arrangement shown in FIG. 6 in which an inlet 20' through which a molten resinous material 52" is injected into a mold cavity 21' is disposed aside and thin sheet glass 50", 50"'of a specified shape is overlaid on the respective inner sides of a movable die 18' and a fixed die 19" in a close contact manner. Reference numerals 56' and 56" respectively designate an intermediate layer. As a matter of course, these intermediate layers 56' and 56" may be omitted and a silane coupling agent or Volan may be applied in pretreatment instead of provision of the intermediate layers 56', 56". Additionally, the sheet glass 50"' constituting the glass layer 55"' may be replaced by a transparent resin sheet made from one of the previously listed resinous materials such as polycarbonate, acrylic resin, polystyrene, amorphous polyolefin, polyethylene terephthalate, ethylene-vinyl acetate copolymers (EVA), thermoplastic polyurethane (TPU), ethylene-acrylate-maleic anhydride ternary copolymers, hydrogenated styrene butadiene rubber (SBR hydride), polyvinyl butyral (PVB) and polyolefin elastomers. In this case, the preferable resinous material of the resin sheet is harder and has a higher melting point than the resinous material of the resin layer 57. Additionally, the intermediate layer formed by affixing a resin film or by primer coating may be provided between the resin sheet and the resin layer 57", and printing treatment may be applied to the joint surface of the sheet glass to which the resin film is affixed or primer coating has been applied. Further, mirror finishing or a transparent conductive film may be applied to the joint surface of the resin sheet joining to the intermediate layer. Needless to say, the intermediate layer may be omitted.

An impact test was conducted using the composite sheet material 58 in which a 0.1 mm-thick glass layer 55, a 0.4 mm-thick intermediate layer 56 of the resin film 51 made from thermoplastic polyurethane (resinous material) and a 6 mm-thick resin layer 57 formed from a polycarbonate were laminated. From 1 m above the composite sheet material 58, a steel ball of 225g in weight was naturally dropped onto this composite sheet material 58 with the glass layer 55 facing up. As a result, no cracks were observed in the glass layer 55.

The composite sheet material may be modified to include a plurality of resin layers molded from molten resinous materials. For example, there may be provided a composite sheet material comprising a glass layer formed from sheet glass, a resin layer molded from a molten resinous material, a resin layer formed from a resin sheet, a resin layer molded from a molten resinous material and a resin layer formed from a resin sheet, these layers being laminated in order. A composite sheet material according to another example comprises a glass layer formed from sheet glass, a resin layer molded from a molten resinous material, a resin layer formed from a resin sheet, a resin layer molded from a molten resinous material, and a glass layer formed from sheet glass, these layers being laminated in order.

The compression molding unit such as disclosed in Japanese Patent Laid-Open Publications Nos. 5-220749 (1993) and 5-285955 (1993) may be used in place of the compression molding unit 10 of the forgoing embodiment.

For making the resin layer 57 thinner to meet the requirement in some composite sheet material designs, the following procedure is taken: A composite sheet material is injected by the hot press process such as disclosed in Japanese Patent Laid-Open Publications Nos. 4-361034 (1992) and 4-339646 (1992). The composite sheet material is then cooled to room temperature for subsequently carrying out easy thinning in a short time. After that, the composite sheet material is pressurized for 10 seconds at a plate temperature of 150° and a pressure of 5 kg/cm$^2$, using the hot press disclosed in Japanese Patent Laid-Open Publication No. 8-19896 (1996) so that the solidified resin layer 57 is heated, softened and compressed to a thickness of 0.6 mm to 1 mm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a composite sheet material having a glass layer and a resin layer which are laminated together, the method comprising the steps of:

placing sheet glass in at least either of a pair of dies in a compression molding machine so as to come into close contact with the die;

applying a uniform pressure to an entire molten resinous material which has been introduced into a mold cavity, such that the molten resinous material is elongated, spreading over the sheet glass; and closing the dies to complete compression molding.

2. The composite sheet material producing method according to claim 1, wherein said uniform pressure applied to the entire molten resinous material is high enough to restrain gas contained in the molten resinous material from growing to be bubbles.

3. The composite sheet material producing method according to claim 1 or 2, wherein the joint surface of said sheet glass joining to the resin layer molded from said molten resinous material undergoes primer coating treatment to be coated with a resinous material or is preliminarily provided with a resin film of said resinous material, said resinous material used in the primer coating and constituting the resin film being adhesive to the sheet glass and to the molding, molten resinous material and moderating the contraction difference and thermal expansion difference between the sheet glass and the molten resinous material during molding of the molten resinous material into the resin layer.

4. The composite sheet material producing method according to claim 3, wherein printing is applied to the joint surface of the sheet glass to which primer coating has been applied or the resin film has been affixed.

5. The composite sheet material producing method according to claim 1 or 2, wherein the composite sheet material, which has been molded through elongation by applying the uniform pressure onto the entire molten resinous material, is subjected to compression molding again wherein the composite sheet material is interposed between a first plate having a heater and a second plate parallel to the first plate and having a heater and then, the molten resinous material of the composite sheet material is again fluidized and elongated by applying heat and a uniform pressure to the entire molten resinous material.

6. The composite sheet material producing method according to claim 5, wherein, in said re-compression molding, the molding temperature and pressure necessary for re-fluidizing and elongating the molten resinous material which has been once solidified are 200° C. or less and 20 kg/cm² or less, respectively.

7. The composite sheet material producing method according to claim 1, wherein the joint surface of the sheet glass of said glass layer joining to said resin layer is coated with silane coupling agent or methacrylatochromic chloride in pretreatment.

8. The composite sheet material producing method according to claim 1, wherein said sheet glass is transparent and said molten resinous material is selected from the group consisting of polycarbonate, acrylic resin, polystyrene, amorphous polyolefin, polyethylene terephthalate, ethylene-vinyl acetate copolymers, thermoplastic polyurethane, ethylene-acrylate-maleic anhydride ternary copolymers, hydrogenated styrene butadiene rubber, polyvinyl butyral and polyolefin elastomers, and wherein the uniform pressure applied to the entire molten resinous material is not less than 15 kg/cm² which is high enough to restrain gas contained in the molten resinous material from growing to be bubbles.

9. The composite sheet material producing method according to claim 1, wherein the joint surface of the sheet glass of said glass layer joining to said resin layer is provided with mirror coating or coated with a light transparent electrically conductive film.

10. A composite sheet material producing method, wherein two sheet glasses are first provided so as to be respectively in contact with the respective inner sides of both dies used in a compression molding machine and then while supplying a molten resinous material to a mold cavity, compression molding is carried out by applying a uniform pressure to an entire molten resinous material which has been introduced into a mold cavity and then closing the dies to complete compression molding, such that the molten resinous material is elongated, spreading over the sheet glasses, whereby the laminated plate having, in a laminated fashion, a first glass layer composed of the sheet glass, a resin layer molded from the molten resinous material that is spread by applying a pressure and a second glass layer composed of the sheet glasses can be formed.

11. The composite sheet material producing method according to claim 10, wherein said uniform pressure applied to the entire molten resinous material is high enough to restrain gas contained in the molten resinous material from growing to be bubbles.

12. The composite sheet material producing method according to claim 10, wherein a silane coupling agent or methacrylatochromic chloride is applied, in pretreatment, to at least either the joint surface of the sheet glass of the first glass layer joining to the resin layer or the joint surface of the sheet glass of the second glass layer joining to the resin layer.

13. The composite sheet material producing method according to claim 10, wherein said sheet glasses are transparent and said molten resinous material is selected from the group consisting of polycarbonate, acrylic resin, polystyrene, amorphous polyolefin, polyethylene terephthalate, ethylene-vinyl acetate copolymers, thermoplastic polyurethane, ethylene-acrylate-maleic anhydride ternary copolymers, hydrogenated styrene butadiene rubber, polyvinyl butyral and polyolefin elastomers, and wherein the uniform pressure applied to the entire molten resinous material is not less than 15 kg/cm² which is high enough to restrain gas contained in the molten resinous material from growing to be bubbles.

14. The composite sheet material producing method according to claim 10, wherein at least either the joint surface of the sheet glass of said first glass layer joining to said resin layer or the joint surface of the sheet glass of said second glass layer joining to said resin layer is provided with mirror coating or coated with a transparent conductive film.

\* \* \* \* \*

UNITED STATES PATENT AND TRADEMARK OFFICE
CERTIFICATE OF CORRECTION

PATENT NO. : 6,296,799 B1
DATED : October 2, 2001
INVENTOR(S) : Sato et al.

It is certified that error appears in the above-identified patent and that said Letters Patent is hereby corrected as shown below:

<u>Title page,</u>
Item [54], change "PLATE-LIKE COMPOSITE MATERIAL AND METHOD OF PRODUCING THE SAME" to be -- COMPOSITE SHEET MATERIAL AND METHOD FOR MAKING THE SAME --

Signed and Sealed this

Twenty-fifth Day of June, 2002

Attest:

Attesting Officer

JAMES E. ROGAN
*Director of the United States Patent and Trademark Office*